United States Patent
Tokumo et al.

(10) Patent No.: US 10,637,791 B2
(45) Date of Patent: *Apr. 28, 2020

(54) REPRODUCTION DEVICE AND GENERATION DEVICE

(71) Applicant: SHARP KABUSHIKI KAISHA, Sakai, Osaka (JP)

(72) Inventors: Yasuaki Tokumo, Sakai (JP); Shuichi Watanabe, Sakai (JP); Takuya Iwanami, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/722,809

(22) Filed: Oct. 2, 2017

(65) Prior Publication Data

US 2018/0041441 A1 Feb. 8, 2018

Related U.S. Application Data

(63) Continuation of application No. 14/375,352, filed as application No. PCT/JP2013/051708 on Jan. 28, 2013, now Pat. No. 9,813,350.

(30) Foreign Application Priority Data

Jan. 31, 2012 (JP) ................... 2012-019155

(51) Int. Cl.
*H04L 12/801* (2013.01)
*H04L 29/08* (2006.01)

(52) U.S. Cl.
CPC .............. *H04L 47/34* (2013.01); *H04L 67/02* (2013.01); *H04L 69/324* (2013.01)

(58) Field of Classification Search
CPC combination set(s) only.
See application file for complete search history.

(56) References Cited

U.S. PATENT DOCUMENTS 6,487,543 B1 11/2002 Ozaki et al.
8,595,285 B2 * 11/2013 Kellermann ........... H04H 60/68
709/201

(Continued)

FOREIGN PATENT DOCUMENTS

JP 10-173612 A 6/1998
JP 11-215192 A 8/1999

(Continued)

OTHER PUBLICATIONS

Extended European Search Report, dated Jun. 19, 2015, for European Application No. 13743705.9.

(Continued)

*Primary Examiner* — Yee F Lam
(74) *Attorney, Agent, or Firm* — Birch, Stewart, Kolasch & Birch, LLP

(57) ABSTRACT

There is provided a transmitter by which a reception side easily detects packet loss of a transport packet. The transmitter (1) includes a content dividing unit (13) that divides a set composed of a plurality of units into a plurality of subsets, a transport sequence assigning unit (15) that assigns, to the packet, the transport sequence of the unit within a component and the transport sequence of the unit within the subset, and a header generating unit (14) that generates a packet including the transport sequences.

1 Claim, 15 Drawing Sheets

INTRA SEQUENCE NUMBER (8 BITS)   PAYLOAD

INTER SEQUENCE NUMBER (8 BITS)

(56) References Cited

U.S. PATENT DOCUMENTS

| | | | |
|---|---|---|---|
| 9,112,946 B2* | 8/2015 | Park | H04L 69/22 |
| 9,319,721 B2* | 4/2016 | Bae | H04L 12/4633 |
| 9,386,125 B2* | 7/2016 | Bae | H04L 69/04 |
| 9,848,217 B2* | 12/2017 | Choi | H04N 21/234327 |
| 9,877,051 B2* | 1/2018 | Hwang | H04N 21/242 |
| 2002/0116715 A1 | 8/2002 | Apostolopoulos | |
| 2004/0228413 A1 | 11/2004 | Hannuksela | |
| 2005/0117654 A1 | 6/2005 | Im | |
| 2005/0123042 A1 | 6/2005 | Park | |
| 2005/0169303 A1 | 8/2005 | Toma et al. | |
| 2005/0188407 A1 | 8/2005 | van Beek et al. | |
| 2005/0213943 A1* | 9/2005 | Arai | G11B 20/00 386/263 |
| 2006/0059531 A1* | 3/2006 | Fukuda | G11B 27/034 725/134 |
| 2006/0095942 A1 | 5/2006 | van Beek | |
| 2006/0117340 A1* | 6/2006 | Pavlovskaia | H04N 7/163 725/34 |
| 2006/0168133 A1 | 7/2006 | Park et al. | |
| 2007/0116302 A1* | 5/2007 | Kim | G11B 20/10527 381/119 |
| 2008/0313678 A1 | 12/2008 | Ryu et al. | |
| 2008/0315318 A1 | 12/2008 | Naoe et al. | |
| 2009/0019007 A1* | 1/2009 | Niina | G06F 17/30463 |
| 2011/0125918 A1 | 5/2011 | Ha et al. | |
| 2011/0149049 A1* | 6/2011 | Sasaki | H04N 13/178 348/51 |
| 2011/0164664 A1 | 7/2011 | Torsner et al. | |
| 2012/0185907 A1 | 7/2012 | Park et al. | |
| 2012/0320925 A1* | 12/2012 | Park | H04L 65/607 370/400 |
| 2013/0094502 A1 | 4/2013 | Hwang | |
| 2013/0094545 A1* | 4/2013 | Park | H04N 21/236 375/219 |
| 2013/0094563 A1* | 4/2013 | Bae | H04N 21/236 375/240.01 |
| 2013/0136193 A1* | 5/2013 | Hwang | H03M 13/05 375/240.27 |
| 2013/0297817 A1* | 11/2013 | Bae | H04L 65/608 709/231 |
| 2013/0297822 A1* | 11/2013 | Park | H04N 21/2381 709/236 |
| 2013/0298177 A1* | 11/2013 | Rhyu | H04N 21/643 725/110 |
| 2014/0133489 A1* | 5/2014 | Bae | H04L 69/04 370/392 |
| 2014/0282799 A1* | 9/2014 | Bae | H04N 21/236 725/116 |
| 2014/0314158 A1* | 10/2014 | Hwang | H04L 1/0041 375/240.27 |
| 2014/0325572 A1* | 10/2014 | Yie | H04H 60/73 725/74 |
| 2014/0334504 A1* | 11/2014 | Yie | H04H 20/18 370/474 |
| 2014/0344470 A1* | 11/2014 | Lee | H04N 21/236 709/231 |
| 2014/0344875 A1* | 11/2014 | Bae | H04N 21/2381 725/109 |
| 2014/0369222 A1* | 12/2014 | Kim | H04L 65/4076 370/252 |
| 2015/0020131 A1* | 1/2015 | Choi | H04N 21/234327 725/109 |
| 2015/0023355 A1 | 1/2015 | Tokumo et al. | |
| 2015/0124818 A1* | 5/2015 | Bae | H04N 21/234327 370/392 |
| 2016/0294661 A1* | 10/2016 | Bae | H04L 69/04 |

FOREIGN PATENT DOCUMENTS

| | | |
|---|---|---|
| JP | 2003-152626 A | 5/2003 |
| JP | 2005-507569 A | 3/2005 |
| JP | 2009-239444 A | 10/2009 |
| JP | 2012-503408 A | 2/2012 |
| WO | WO 2011/029900 A1 | 3/2011 |
| WO | WO 2013/115121 A1 | 8/2013 |

OTHER PUBLICATIONS

International Search Report for PCT/JP2013/051708 dated Mar. 5, 2013.

Kyuheon Kim, "MPEG Media Transport", Terms and definitions, pp. 10-11, Nov. 13, 2011, URL:http:/edu.tta.or.kr/sub3/down.php?No=97&file=1-1_MMT_111113.pdf.

Advisory Action issued in copending U.S. Appl. No. 14/375,352, dated Jul. 6, 2016.

Advisory Action issued in copending U.S. Appl. No. 14/375,352, dated Jun. 9, 2017.

Final Office Action issued in copending U.S. Appl. No. 14/375,352, dated Mar. 16, 2017.

Final Office Action issued in copending U.S. Appl. No. 14/375,352, dated Mar. 24, 2016.

Non-Final Office Action issued in copending U.S. Appl. No. 14/375,352, dated Oct. 19, 2015.

Non-Final Office Action issued in copending U.S. Appl. No. 14/375,352, dated Sep. 29, 2016.

Notice of Allowance issued in copending U.S. Appl. No. 14/375,352, dated Jul. 5, 2017.

\* cited by examiner

FIG. 5

| transport_packet_header() { | REQUIRED NUMBER OF BITS |
|---|---|
| ... | |
|   inter_flag | 1 |
| | |
|   if (inter_flag == '1') { | |
|     intra_sequence_number | 8 |
|     inter_sequence_number | 8 |
|   } else { | |
|     /* intra sequence number */ | |
|     sequence_number | 16 |
|   } | |
|   ... | |
| } | |

FIG. 7

| transport_packet_header() { | REQUIRED NUMBER OF BITS |
|---|---|
| ... | |
|    concatenated_flag | 1 |
| | |
|    if (concatenated_flag == '1') { | |
|       concatenated_sequence_number | 16 |
|    } else { | |
|       /* intra sequence number */ | |
|       sequence_number | 16 |
|    } | |
|    ... | |
| } | |

FIG. 8

```
<smil>
  <head>
    <layout>
      <region xml:id="r1" top="0%" left="0%" width="100%" height="100%"/>
      <region xml:id="r2" top="0%" left="0%" width="50%" height="50%"/>
    </layout>
  </head>
  <body>
    <seq start="0s" end="30m">
      <par>
        <union>
          <asset xml:id="a11" region="r1"/>
          <asset xml:id="a12" region="r1"/>
        </union>
        <excl>
          <asset xml:id="a21" region="r2"/>
          <asset xml:id="a22" region="r2"/>
        </excl>
      </par>
    </seq>
  </body>
</smil>
```

COMPLETE ASSET CONFIGURED BY ACQUIRING a11 AND a12 AND UNITING THEM

SELECTABLE COMPOSITIONS

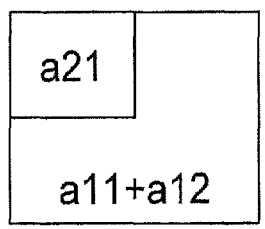 OR 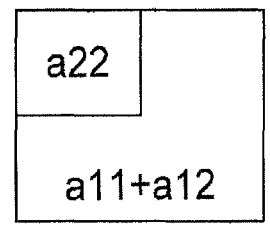

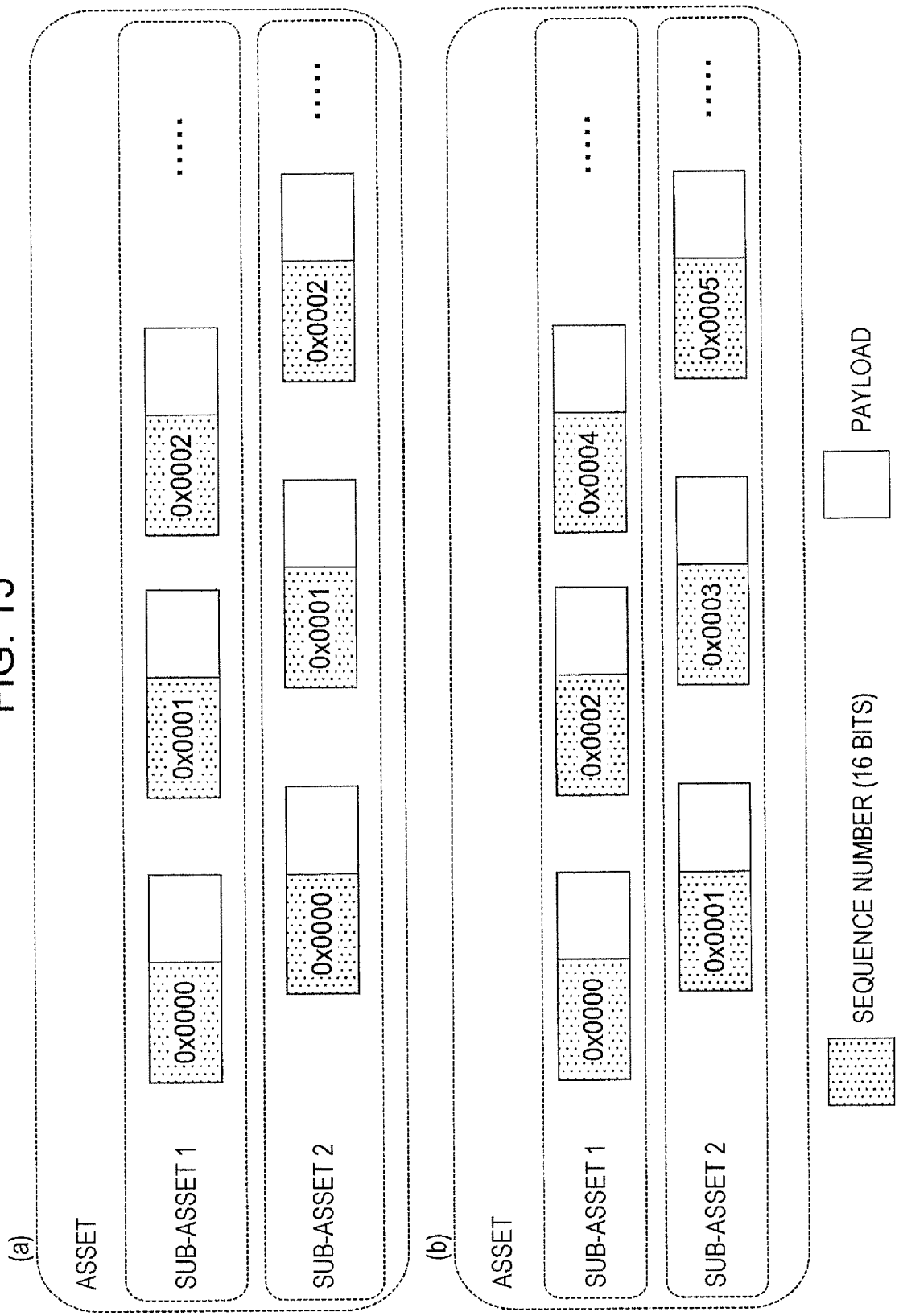

REPRODUCTION DEVICE AND GENERATION DEVICE

CROSS-REFERENCE TO RELATED APPLICATIONS

This application is a Continuation of co-pending application Ser. No. 14/375,352, filed on Jul. 29, 2014, which was filed as PCT International Application No. PCT/JP2013/051708 on Jan. 28, 2013, which claims the benefit under 350 U.S.C. § 119(a) to Patent Application No. 2012-019155, filed in Japan on Jan. 31, 2012, all of which are hereby expressly incorporated by reference into the present application.

TECHNICAL FIELD

The present invention relates to a data structure and the like for delivering content composed of one or more components.

BACKGROUND ART

In recent years, various types of content, such as video, sound, and text, are being delivered. Standardization of the transport format for delivering such content is also advancing. In particular, standardization of MPEG media transport (MPEG MMT) protocol is gaining attention.

In MPEG MMT, standardization is advancing for a transport format and the like that efficiently deliver a plurality of components, such as video, sound, and text, over differing paths (hybrid delivery).

The content in MPEG MMT is stored as a package (MMT package) and includes, in addition to a plurality of components (MMT assets), at least data related to composition information (CI) and transport characteristics information (TC). The composition information indicates reproduction conditions, such as layout including display position, size, and the like of each component, and whether or not components can be combined. The transport characteristics information includes required bandwidth, allowable delay, and the like of each component, used to determine the optimal delivery path.

The components included in such content can be divided into packets and transported over a single network, or transported over a plurality of networks (hybrid). This will be described with reference to FIG. 14. FIG. 14 is a diagram of content transport formats. FIG. 14(a) shows an example of transport over a single network. FIG. 14(b) shows an example of hybrid transport over a plurality of networks. In FIG. 14, a single transport packet is indicated by a single block.

In the example in FIG. 14(a), a transport packet CI for configuration information and a transport packet TC for transport characteristics information are followed by a plurality of transport packets ($A_{1,1}, A_{2,1}, \ldots$). Transport packet $A_{1,1}$ and subsequent transport packets $A_{i,j}$: i=1, 2, . . . , j=1, 2, . . . ) each include a media unit composing an asset. These media units are transmitted to a receiver over a network determined based on the TC, and the receiver reproduces these media units based on the CI.

In the example in FIG. 14(a), all transport packets are delivered from a transmitter to a receiver by a single path over a single network.

On the other hand, in the example in FIG. 14(b), transport packets ($A_{2,1}, A_{2,3}, \ldots$) and ($A_{2,2}, A_{2,4}, \ldots$), obtained by dividing into two a transport packet $A_{2,j}$ including a media unit composing a second asset, and transport packets ($A_{1,1}, A_{1,2}, \ldots$) including media units composing a first asset are each transported on differing paths over differing networks. The hybrid transport is also described in PTL 1, below.

CITATION LIST

Patent Literature

PTL 1: Japanese Unexamined Patent Application Publication No. 10-173612 (published Jun. 26, 1998)

SUMMARY OF THE INVENTION

Technical Problem

Sequence information (sequence number) is attached to each of the plurality of transport packets such as those described above. At this time, the receiver is required to identify, on the reception side, the sequence relationship among the packets composing a component to reconstruct the component, detect packet loss, and the like. However, when a single component (asset) is divided into a plurality of subsets (sub-assets) and the sub-assets are transmitted over differing networks, a problem occurs in that the reception side cannot determine the packet sequence among the sub-assets. In addition, a problem also occurs in that the reception side cannot determine whether or not a packet is missing within the sub-asset.

This will be described with reference to FIG. 15. FIG. 15 is a diagram of examples of a transport packet of a conventional technology. FIG. 15(a) shows an example of the transport packet when each transport packet is given a sequence number in sub-asset units. FIG. 15(b) shows an example of the transport packet when each transport packet is given a sequence number throughout the overall asset.

As shown in FIG. 15(a), the asset is composed of a sub-asset 1 and a sub-asset 2. In addition, the sub-asset 1 and the sub-asset 2 are transported over differing networks.

Furthermore, the transport packets of the sub-asset 1 and the sub-asset 2 each have a transport packet format in which a header is attached to a payload. A sequence number (16 bits) is attached to each header for each sub-asset. As shown in FIG. 15(a), sequence numbers 0x0000, 0x0001, 0x0002, . . . are respectively attached to the transport packets of the sub-asset 1 in the order of transport. Similarly, sequence numbers 0x0000, 0x0001, 0x0002, . . . are respectively attached to the transport packets of the sub-asset 2 in the order of transport.

When such asset is transported, the receiver receives transport packets that are given the same sequence numbers. Specifically, for example, the receiver receives the sub-asset 1 and the sub-asset 2 that each include a transport packet that is given the sequence number 0x0001. At this time, the receiver knows that the transport packet of the sub-asset 1 that is given the sequence number 0x0001 is the second packet of the sub-asset 1, and knows that the transport packet of the sub-asset 2 that is given the sequence number 0x0001 is the second packet of the sub-asset 2. However, the receiver which has received such transport packets cannot determine the packet sequence between the transport packet of the sub-asset 1 that is given the sequence number 0x0001 and the transport packet of the sub-asset 2 that is given the sequence number 0x0001. In this way, in the transport packet shown in FIG. 15(a), the receiver can determine the packet sequence of the received transport packets for each sub-asset but cannot determine the packet sequence between sub-assets.

In addition, the asset in FIG. 15(b) is composed of the sub-asset 1 and the sub-asset 2, in a manner similar to the asset in FIG. 15(a). A sequence number is attached to each header for each transport packet throughout the overall asset. As shown in FIG. 15(b), because the sequence numbers are attached throughout the overall asset, no same sequence numbers are present. The transport packets of the sub-asset 1 are respectively given the sequence numbers 0x0000, 0x0002, 0x0004, . . . in the order of transport, and the transport packets of the sub-asset 2 are respectively given the sequence numbers 0x0001, 0x0003, 0x0005, . . . in the order of transport.

Such sub-asset 1 and sub-asset 2 are transported over differing networks. When the receiver receives only the sub-asset from one network, such as only the sub-asset 1, the receiver receives the transport packets given the sequence numbers 0x0000, 0x0002, 0x0004, . . . . At this time, the receiver cannot determine whether the transport packets given the sequence numbers 0x0001, 0x0003, 0x0005, . . . are included in another sub-asset or packet loss has occurred.

The present invention has been achieved in light of the above-described problems. An object of the present invention is to provide a generation device and the like that generate a packet group enabling packet loss to be easily detected when packet loss occurs, while notifying a reproduction device on a reception side of an appropriate transport sequence for each packet.

Solution to Problem

To solve the above-described problems, a generation device of the present invention is a generation device that generates a packet including one of a plurality of units composing a component to transmit content composed of one or more components, the generation device including: a first transport sequence assigning means for assigning, to the packet including the unit, first transport sequence information indicating the transport sequence of the unit within the component for each of the plurality of units; a second transport sequence assigning means for assigning, to the packet including the unit, second transport sequence information indicating the transport sequence of the unit for each unit composing the content; and a packet generating means for generating, as the packet including the unit, a packet including the first transport sequence information assigned to the packet by the first transport sequence assigning means and the second transport sequence information assigned to the packet by the second transport sequence assigning means, for each of the plurality of units.

In addition, the generation device of the present invention is a generation device that generates a packet including one of a plurality of units generated by dividing a component to transmit content composed of one or more components, the generation device including: a dividing means for dividing a set composed of a plurality of units into a plurality of subsets; a first transport sequence assigning means for assigning, to the packet including the unit, first transport sequence information indicating the transport sequence of the unit within the component for each of the plurality of units; a second transport sequence assigning means for assigning, to the packet including the unit, second transport sequence information indicating the transport sequence of the unit within the subset for each unit composing the subset, for each subset divided by the dividing means; and a packet generating means for generating, as the packet including the unit, a packet including the first transport sequence information assigned to the packet by the first transport sequence assigning means and the second transport sequence information assigned to the packet by the second transport sequence assigning means, for each of the plurality of units.

In addition, to solve the above-described problems, a generation method of the present invention is a generation method for a packet by a generation device that generates a packet including one of a plurality of units generated by dividing a component to transmit content composed of one or more components, the generation method including: a dividing step of dividing a set composed of the plurality of units into a plurality of subsets; a first transport sequence assigning step of assigning, to the packet including the unit, first transport sequence information indicating the transport sequence of the unit within the component, for each of the plurality of units; a second transport sequence assigning step of assigning, to the packet including the unit, second transport sequence information indicating the transport sequence of the unit within the subset for each unit composing the subset, for each subset divided at the dividing step; and a packet generating step of generating, as the packet including the unit, a packet including the first transport sequence information assigned to the packet at the first transport sequence assigning step and the second transport sequence information assigned to the packet at the second transport sequence assigning step, for each of the plurality of units.

In the above-described configuration, a packet is generated that includes the first transport sequence information indicating the transport sequence of the unit within the component for each of the plurality of units and the second transport sequence information indicating the transport sequence of the unit within the subset for each unit composing the subset.

Therefore, a reproduction device that has received the packet can know the transport sequence of the unit in component units and subset units from the transport sequence of the unit within the component and the transport sequence of the unit within the subset.

Therefore, the reproduction device can easily determine which packet has not been transported, and an effect in which packet loss is easily detected is achieved.

In addition, to solve the above-described problems, a reproduction device of the present invention is a reproduction device that receives and reproduces content composed of one or more components as a packet including the component as a divided unit, the reproduction device including: a detecting means for detecting that the received packet includes first transport sequence information indicating the transport sequence of the unit within the component and second transport sequence information indicating the transport sequence of the unit within a subset composed of a plurality of units including the unit; and a reproducing means for processing, when the detecting means detects that the packet includes the first transport sequence information and the second transport sequence information, the unit included in the packet based on the transport sequence of the unit within the component and the transport sequence of the unit within the subset.

In addition, to solve the above-described problems, a reproduction method of the present invention is a reproduction method by a reproduction device that receives and reproduces content composed of one or more components as a packet including the component as a divided unit, the reproduction method including: a detecting step of detecting that the received packet includes first transport sequence information indicating the transport sequence of the unit within the component and second transport sequence information indicating the transport sequence of the unit within a subset composed of a plurality of units including the unit; and a reproducing step of processing, when the detecting step detects that the packet includes the first transport sequence information and the second transport sequence information, the unit included in the packet based on the transport sequence of the unit within the component and the transport sequence of the unit within the subset.

In the above-described configuration, when the received packet includes the transport sequence of the unit within the component and the transport sequence of the unit within the subset, whether or not there is a packet that has not been received can be easily determined. In addition, transport delay attributed to a retransmission request for a lost packet can be reduced.

In addition, to solve the above-described problems, a data structure of the present invention is a data structure of a packet for transmitting content composed of one or more components, the data structure including: a unit generated by dividing the component; first transport sequence information indicating the transport sequence of the unit within the component; and second transport sequence information indicating the transport sequence of the unit within a subset composed of a plurality of units including the unit.

The packet having the above-described data structure includes a unit generated by dividing a component, the first transport sequence information indicating the transport sequence of the unit within the component, and the second transport sequence information indicating the transport sequence of the unit within a subset composed of a plurality of units including the unit. Therefore, the reproduction device that has received the packet having this data structure can identify the transport sequence of the unit within the component and the transport sequence of the unit within the subset, based the first transport sequence information and the second transport sequence information.

Therefore, the reproduction device can know the transport sequence of the unit in component units and subset units. Therefore, the reproduction device can easily determine which packet has not been transported and can easily detect packet loss.

The above-described generation device and reproduction device may be actualized by a computer. In this instance, a control program for actualizing the generation device and the reproduction device by a computer by enabling the computer to operate as each means of the generation device and the reproduction device, and a computer-readable recording medium in which the control program is recorded are also included in the scope of the present invention.

Advantageous Effects of Invention

As described above, the generation device of the present invention includes: the dividing means for dividing a set composed of a plurality of units into a plurality of subsets; the first transport sequence assigning means for assigning, to the packet including the unit, the first transport sequence information indicating the transport sequence of the unit within the component for each of the plurality of units; the second transport sequence assigning means for assigning, to the packet including the unit, the second transport sequence information indicating the transport sequence of the unit within the subset for each unit composing the subset, for each subset divided by the dividing means; and the packet generating means for generating, as the packet including the unit, a packet including the first transport sequence information assigned to the packet by the first transport sequence assigning means and the second transport sequence information assigned to the packet by the second transport sequence assigning means, for each of the plurality of units.

In addition, the generation method of the present invention includes: the dividing step of dividing a set composed of the plurality of units into a plurality of subsets; the first transport sequence assigning step of assigning, to the packet including the unit, the first transport sequence information indicating the transport sequence of the unit within the component, for each of the plurality of units; the second transport sequence assigning step of assigning, to the packet including the unit, the second transport sequence information indicating the transport sequence of the unit within the subset for each unit composing the subset, for each subset divided at the dividing step; the packet generating step of generating, as the packet including the unit, a packet including the first transport sequence information assigned to the packet at the first transport sequence assigning step and the second transport sequence information assigned to the packet at the second transport sequence assigning step, for each of the plurality of units.

In addition, the reproduction device of the present invention includes: the detecting means for detecting that the received packet includes the first transport sequence information indicating the transport sequence of the unit within the component and the second transport sequence information indicating the transport sequence of the unit within a subset composed of a plurality of units including the unit; and the reproducing means for processing, when the detecting means detects that the packet includes the first transport sequence information and the second transport sequence information, the unit included in the packet based on the transport sequence of the unit within the component and the transport sequence of the unit within the subset.

In addition, the reproduction method of the present invention includes: the detecting step of detecting that the received packet includes the first transport sequence information indicating the transport sequence of the unit within the component and the second transport sequence information indicating the transport sequence of the unit within a subset composed of a plurality of units including the unit; and the reproducing step of processing, when the detecting step detects that the packet includes the first transport sequence information and the second transport sequence information, the unit included in the packet based on the transport sequence of the unit within the component and the transport sequence of the unit within the subset.

In addition, the data structure of the present invention includes: a unit generated by dividing the component; the first transport sequence information indicating the transport sequence of the unit within the component; and the second transport sequence information indicating the transport sequence of the unit within a subset composed of a plurality of units including the unit.

Therefore, the reproduction device can easily determine which packet has not been transported, and an effect in which packet loss can be easily detected is achieved.

BRIEF DESCRIPTION OF DRAWINGS

FIG. 5 is a diagram of an example of a structure (syntax) of a transport packet header of the transport packet in FIG. 4.

FIG. 7 is a diagram of an example of a structure (syntax) of a transport packet header of the transport packet in FIG. 6.

FIG. 8 is a diagram of an example of composition information.

FIG. 14 is a diagram of conventionally used content transport formats, in which FIG. 14(a) shows an example of transport over a single network and FIG. 14(b) shows an example of hybrid transport over a plurality of networks.

FIG. 15 is a diagram of examples of a transport packet of a conventional technology, in which FIG. 15(a) shows an example of the transport packet when each transport packet is given a sequence number in sub-asset units and FIG. 15(b) shows an example of the transport packet when each transport packet is given a sequence number throughout the overall asset.

DESCRIPTION OF EMBODIMENTS

An embodiment of the present invention will hereinafter be described in detail with reference to FIG. 1 to FIG. 13.
[System Configuration]

Figure 1:
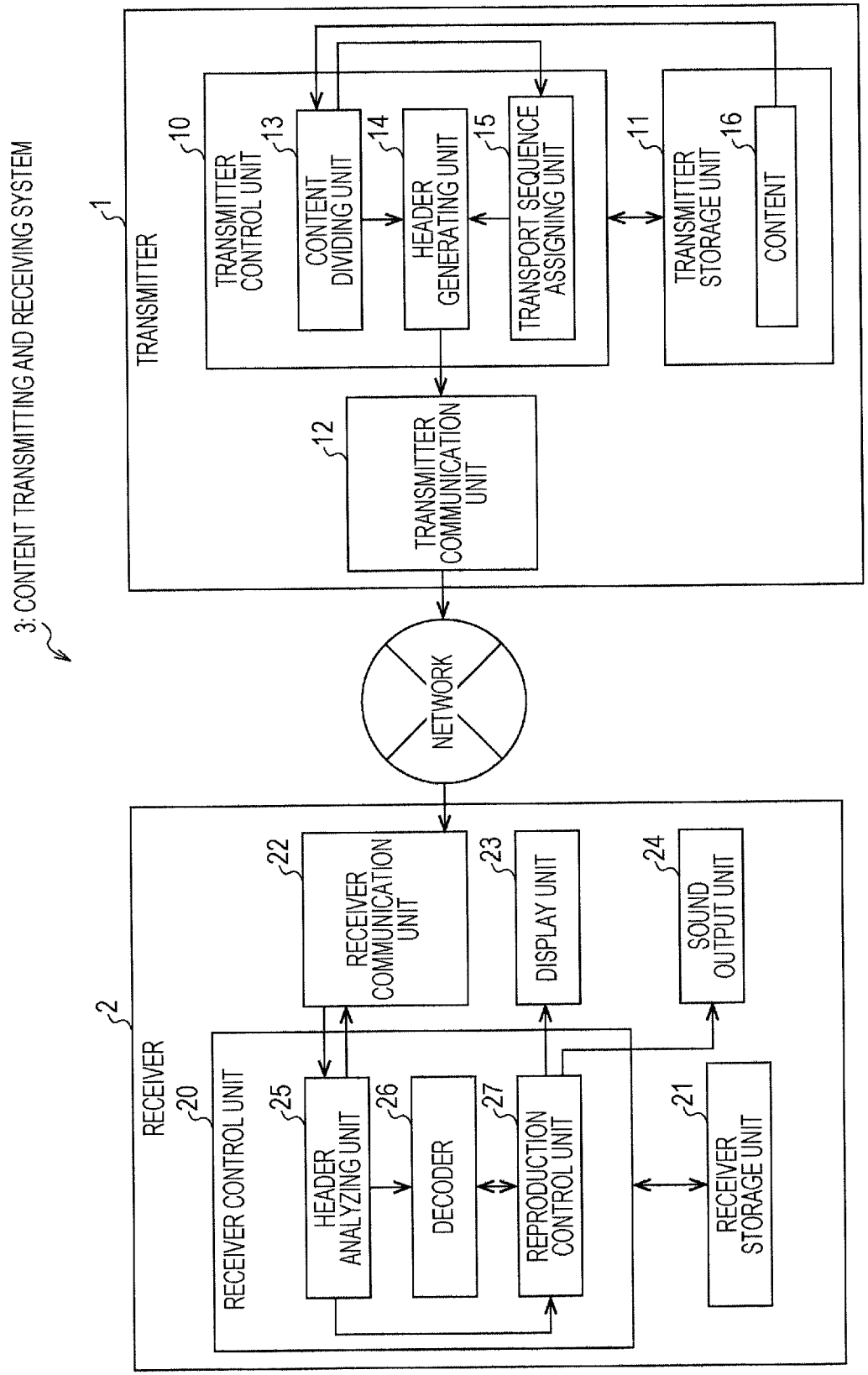
FIG. 1 is a block diagram of a configuration of main sections of a transmitter and a receiver configuring a content transmitting system according to an embodiment of the present invention.

First, a configuration of a content transmitting and receiving system according to the present embodiment will be described with reference to FIG. 1. FIG. 1 is a block diagram of a configuration of main sections of a transmitter (generation device) 1 and a receiver (reproduction device) 2 configuring a content transmitting and receiving system 3.

As shown in FIG. 1, the content transmitting and receiving system 3 is configured by the transmitter 1 and the receiver 2 being connected by a network. In the content transmitting and receiving system 3, the receiver 2 receives and reproduces content transmitted by the transmitter 1.

In the example in FIG. 1, the transmitter 1 and the receiver 1 communicate directly. However, communication is not limited thereto. For example, a relay device may relay communication between the transmitter 1 and the receiver 2. Alternatively, the transmitter 1 may deliver content to another delivery server, and the content may be delivered to the receiver 2 from the delivery server.

In addition, here, an example in which the network connecting the transmitter 1 and the receiver 2 is the Internet is described. However, the network is merely required to enable the transmitter 1 and the receiver 2 to transmit and receive content, and is not limited to the Internet. For example, a broadcast network may be used as the network. Alternatively, hybrid delivery in which the Internet and a broadcast network are used in combination may be performed.

The transmitter 1 is a device that delivers content. The transmitter 1 includes a transmitter control unit 10 that supervises and controls the functions of the transmitter 1, a transmitter storage unit 11 that stores therein data transmitted by the transmitter 1, and a transmitter communication unit 12 that enables the transmitter 1 to communicate with an external device.

In addition, the transmitter control unit 10 includes a content dividing unit (dividing means) 13, a header generating unit (packet generating means) 14, and a transport sequence assigning unit (first transport sequence assigning means and second transport sequence assigning means) 15. Content 16 is stored in the transmitter storage unit 11.

The content dividing unit 13 divides the content 16 for delivery. Specifically, for example, the content dividing unit 13 divides a component of the content into media unit units, thereby generating media units. In addition, the content dividing unit 13 divides the component into a plurality of subsets. Specifically, the content dividing unit 13 divides a set (asset) composed of a plurality of media units into a plurality of subsets (sub-assets). In addition, the content dividing unit 13 identifies and extracts composition information (CI; reproduction information), transport characteristics information (TC), and the like from the content 16. Details of the media unit, the composition information, and the transport characteristics information will be described hereafter.

The transport sequence assigning unit 15 assigns, to a packet including a media unit, information (first transport sequence information) indicating the transport sequence of the media unit within the component, for each of the plurality of media units generated by the content dividing unit 13.

In addition, the transport sequence assigning unit 15 assigns, to a packet including a media unit, information (second transport sequence information) indicating the transport sequence of the media unit within the sub-asset, for each media unit composing the sub-asset, for each sub-asset.

The transport sequence assigning unit 15 supplies the header generating unit with the first transport sequence information and the second transport sequence information assigned to each packet.

The header generating unit 14 generates a header to be attached to the data generated by the content dividing unit 13. Specifically, the header generating unit 14 generates a payload format header including at least information indicating the payload type. The header generating unit 14 adds the payload format header to the media unit, the composition information, and the transport characteristics information, respectively, and generates a payload.

In addition, the header generating unit 14 generates a transport packet header for each packet to be delivered. The header generating unit 14 adds the transport packet header to the payload and generates a transport packet. The transport packet header includes the first transport sequence information and the second transport sequence information supplied from the transport sequence assigning unit 15. The first transport sequence information and the second transport sequence information are hereinafter referred to as packet sequence information.

The content 16 is the content to be delivered by the transmitter 1. As described above, the content 16 is divided by the content dividing unit 13, a header is attached thereto by the header generating unit 14, and is delivered as a transport packet.

On the other hand, the receiver 2 is a device that receives and reproduces content. The receiver 2 includes a receiver control unit 20 that supervises and controls the functions of the receiver 2, a receiver storage unit 21 that stores therein data received by the receiver 2, a receiver communication unit 22 that enables the receiver 2 to communicate with an external device, a display unit 23 that displays an image, and a sound output unit 24 that outputs sound.

In addition, the receiver control unit 20 includes a header analyzing unit (detecting means) 25, a decoder 26, and a reproduction control unit (reproducing means) 27.

The header analyzing unit 25 analyzes the header of a received transport packet and performs a process based on the analysis result. Specifically, when packet loss is detected, such as a discontinuity in the packet sequence information (intra sequence number and/or inter sequence number, described hereafter), the header analyzing unit 25 instructs the receiver communication unit 22 to make a retransmission request. In addition, when the analyzed header indicates that a media unit is included as the payload, the header analyzing unit 25 transmits the payload to the decoder 26 for decoding. On the other hand, when the analyzed header indicates that composition information is included as the payload, the header analyzing unit 25 transmits the payload to the reproduction control unit 27.

The decoder 26 decodes the media unit included in the received transport packet. The decoded data is outputted from the display unit 23 and the sound output unit 24 under the control of the reproduction control unit 27.

The reproduction control unit 27 reproduces the component based on the composition information. Specifically, the reproduction control unit 27 outputs the media unit decoded by the decoder 26 from the display unit 23 and the sound output unit 24, based on the composition information.

[Content Data Structure]

Figure 2:
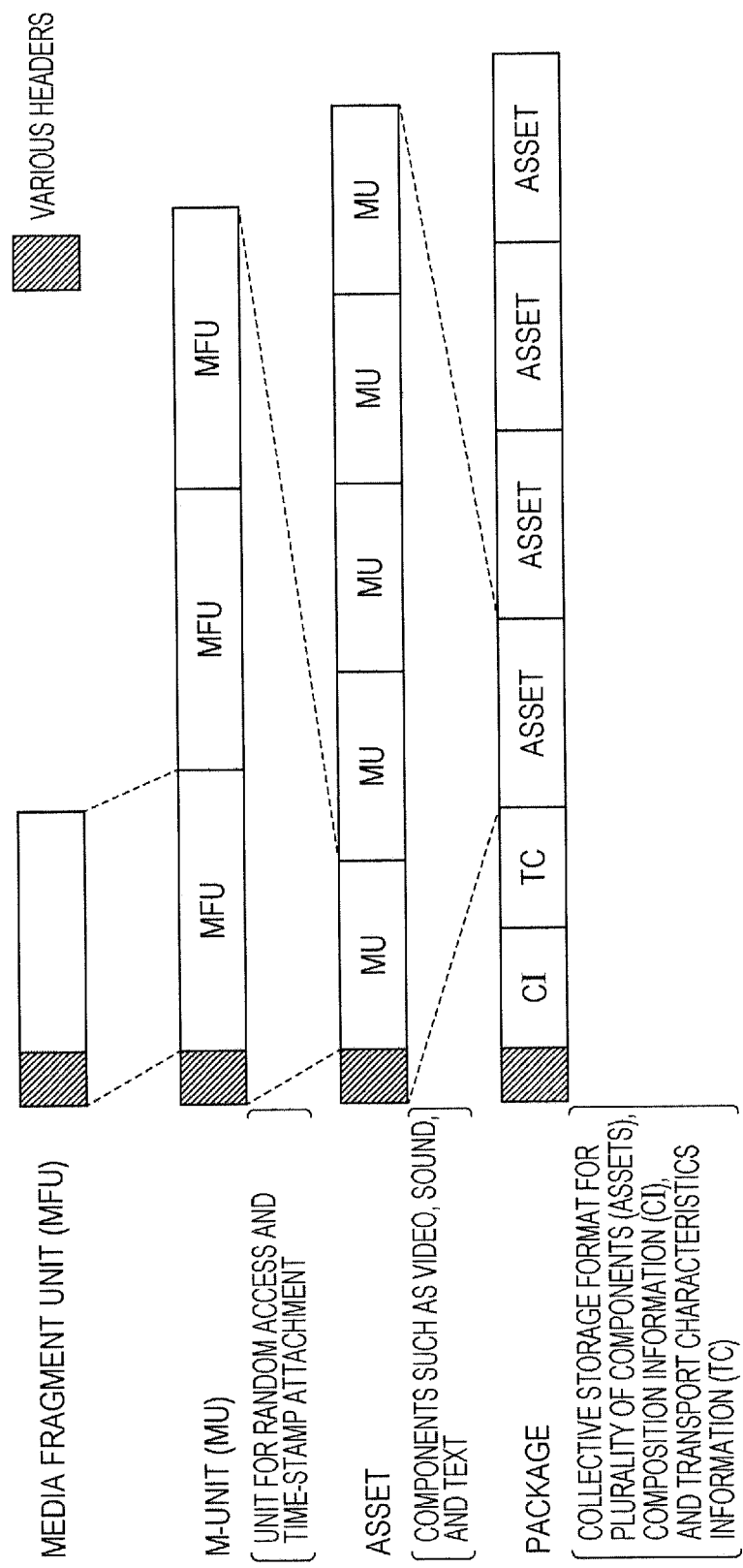
FIG. 2 is a diagram of an example of a data structure of content supported by the content transmitting system.

Next, the data structure of the content 16 will be described with reference to FIG. 2. FIG. 2 is a diagram of an example of the data structure of the content 16.

The content 16 is stored in the transmitter storage unit 11 as a package including a header, the composition information (CI), the transport characteristics information (TC), and a plurality of assets.

The asset is a component, such as video, sound, or text, and is composed of a header and a plurality of media units (M-unit: MU). In addition, the media unit is a unit serving as the unit for random access and time-stamp attachment, and is composed of a header and a plurality of media fragment units (MFU).

The composition information indicates the reproduction format of the component. Specifically, the composition information indicates layout, such as the display position and display size of each component, whether or not components can be combined (whether or not a component can be simultaneously reproduced with another component), and the like. Each media unit is reproduced with reference to the composition information.

The transport characteristics information indicates the transport characteristics of each component. Specifically, the transport characteristics information indicates required bandwidth, allowable delay, and the like of each component, used to determine the optimal delivery path.

[Content Transport Format]

Figure 3:
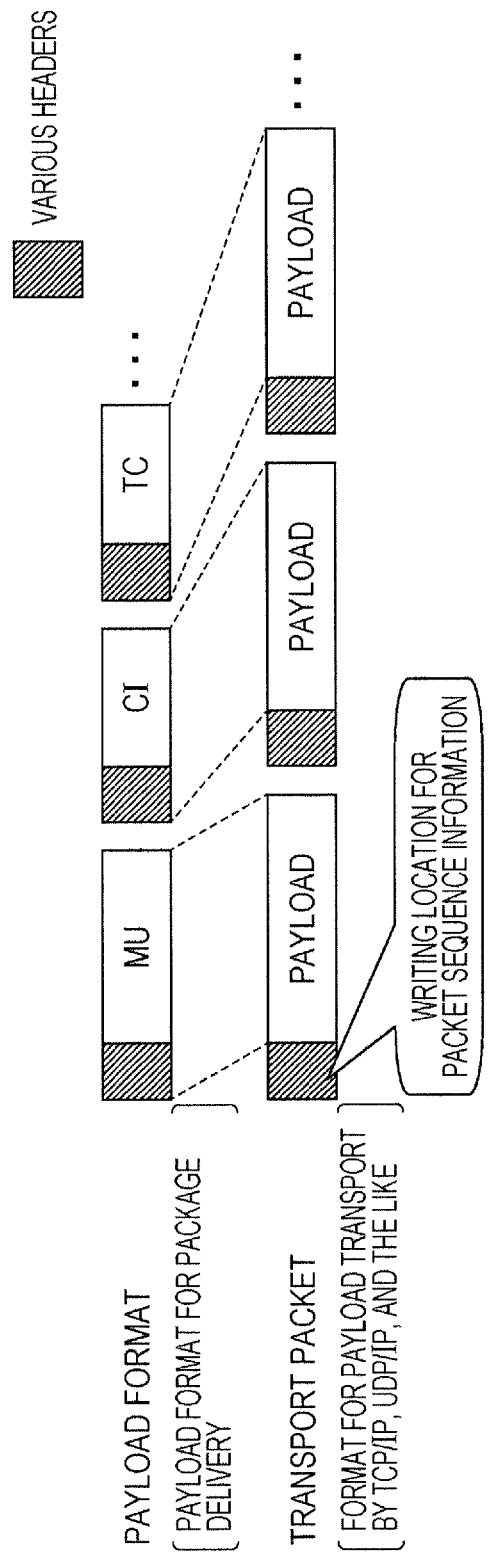
FIG. 3 is a diagram of an example of a transport format of the content.

Next, a transport format of the content 16 will be described with reference to FIG. 3. FIG. 3 is a diagram of an example of the transport format of the content 16.

When the content 16 is transported by TCP/IP, UDP/IP, or the like, the format is a transport packet in which a header is attached to the payload. The above-described packet sequence information is written in the header of the payload.

In addition, the payload format when the package of the content 16 is delivered is that in which a header is attached to the media unit (MU), the composition information (CI), and the transport characteristics information (TC), respectively, as shown in FIG. 3.

In the payload format in FIG. 3, a single media unit serves as a single payload. However, this is not limited thereto. For example, when the size of the transport packet is restricted, the media unit may be further divided, and the divided media units may each be transported as differing payloads. Alternatively, a plurality of media units may be collectively transported as a single payload. In this instance, a configuration may be used in which a flag indicating whether or not the first media fragment unit composing the media unit is included, a flag indicating whether or not the last media fragment unit composing the media unit is included, and the like are written in the payload format header.

[Details of Packet Sequence Information]

Next, details of the packet sequence information will be described with reference to FIG. 4 to FIG. 7.

(Specific Example 1 of Packet Sequence Information)

Figure 4:
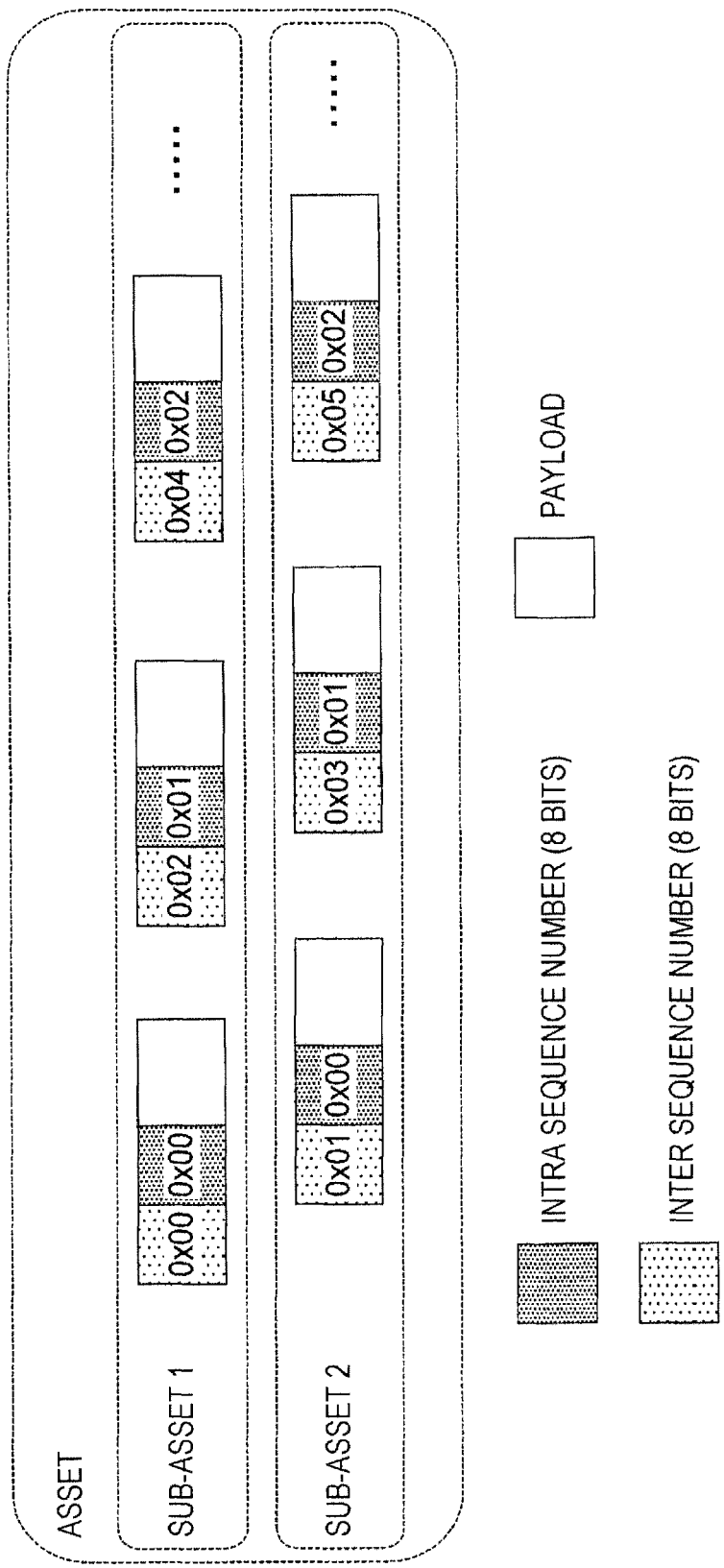
FIG. 4 is a diagram of an example of a transport packet including packet sequence information.

FIG. 4 is a diagram of an example of a transport packet including the packet sequence information. FIG. 4 shows transport packets that are included in an asset composed of a sub-asset 1 and a sub-asset 2. In each transport packet, a 16-bit header is attached to the payload. As the packet sequence information, the header includes an 8-bit intra sequence number (second transport sequence information) indicating the transport sequence of the transport packet within the sub-asset for each sub-asset, and an 8-bit inter sequence number (first transport sequence information) indicating the transport sequence of the transport packet within the asset.

As shown in FIG. 4, the sub-asset 1 includes transport packets of which the intra sequence numbers are 0x00, 0x01, 0x02, . . . . In addition, the sub-asset 2 includes transport packets of which the intra sequence numbers are 0x00, 0x01, 0x02, . . . . The receiver 2 can detect a missing number within the sub-asset (missing packet) by analyzing the intra sequence number.

In addition, the sub-asset 1 includes transport packets of which the inter sequence numbers are even numbers (0x00, 0x02, 0x04, . . . ). The sub-asset 2 includes transport packets of which the inter sequence numbers are odd numbers (0x01, 0x03, 0x05, . . . ). The receiver 2 can determine the sequence in which to transport the transport packets of the asset by analyzing such inter sequence numbers.

FIG. 5 is a diagram of an example of a structure (syntax) of a transport packet header of the transport packet in FIG. 4.

In the transport packet header structure in FIG. 5, if inter_flag=='1' follows a 1-bit flag inter_flag, an 8-bit value intra_sequence_number indicating the intra sequence number and an 8-bit value inter_sequence_number indicating the inter sequence number follow. In addition, if inter_flag=='1' does not follow the 1-bit flag inter_flag, a 16-bit value sequence_number indicating a sequence number similar to a conventional sequence number follows.

In this way, the header generating unit 14 can generate a transport packet including the intra sequence number and the inter sequence number individually.

As a result, the receiver 2 that has received the transport packet can recognize the transport sequence of the transport packet within the asset and the transport sequence of the transport packet within the sub-asset.

(Specific Example 2 of Packet Sequence Information)

Figure 6:
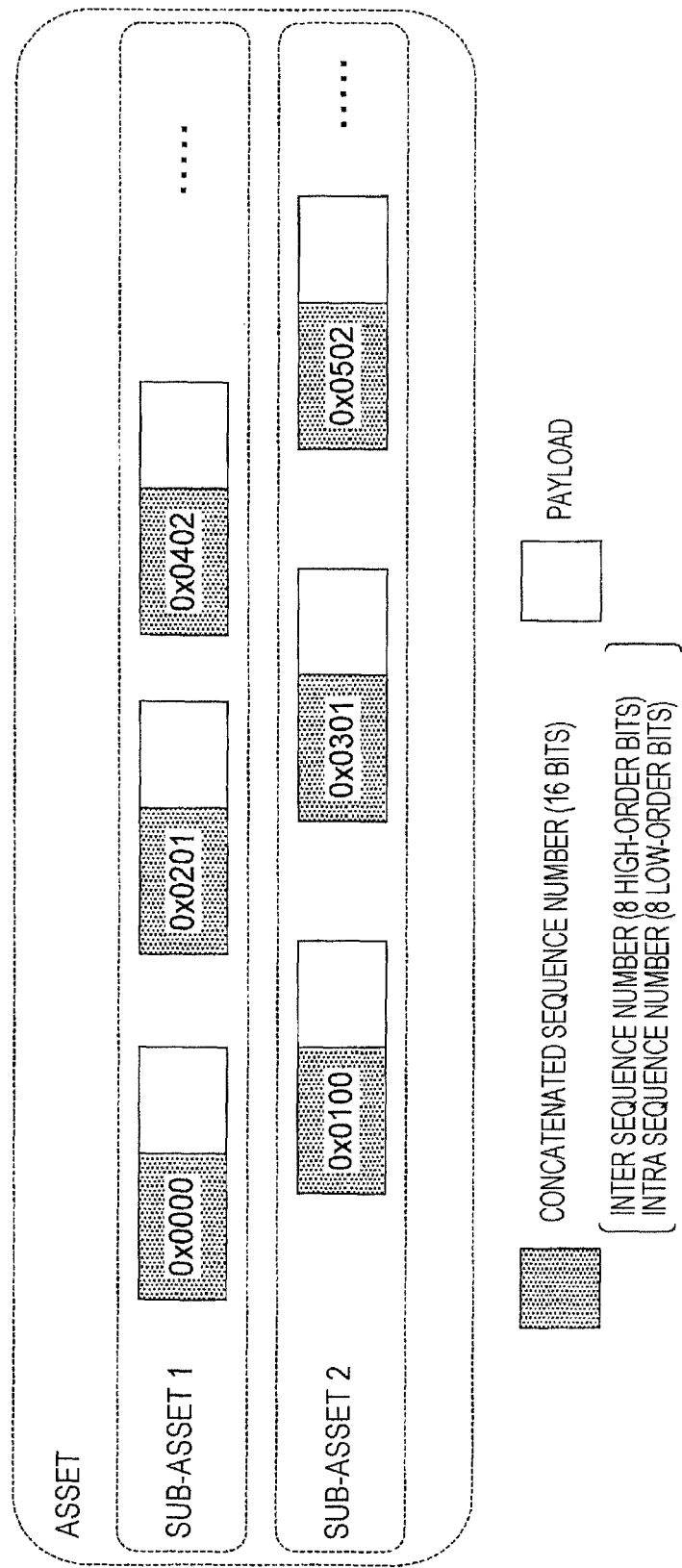
FIG. 6 is a diagram of another example of a transport packet including the packet sequence information.

FIG. 6 is a diagram of another example of the transport packet including the packet sequence information. FIG. 6 shows transport packets that are included in an asset composed of the sub-asset 1 and the sub-asset 2. In each transport packet, a 16-bit header is attached to the payload. As the packet sequence information, a 16-bit concatenated sequence number is written in the header. The eight low-order bits of the concatenated sequence number include the intra sequence number indicating the transport sequence of the transport packet within the sub-asset, for each sub-asset. In addition, the eight high-order bits of the concatenated sequence number include the inter sequence number indicating the transport order of the transport packet within the asset.

As shown in FIG. 6, the sub-asset 1 includes transport packets of which the eight low-order bits (intra sequence number) of the concatenated sequence number are 00, 01, 02, . . . . In addition, the sub-asset 2 includes transport packets of which the eight low-order bits (intra sequence number) of the concatenated sequence number are 00, 01, 02, . . . . The receiver 2 can detect a missing number within the sub-asset (missing packet) by analyzing the eight low-order bits (intra sequence number) of the concatenated sequence number.

In addition, the sub-asset 1 includes transport packets of which the eight high-order bits (inter sequence number) of the concatenated sequence number are even numbers (0x00, 0x02, 0x04, . . . ). The sub-asset 2 includes transport packets of which the eight high-order bits (inter sequence number) of the concatenated sequence number are odd numbers (0x01, 0x03, 0x05, . . . ). The receiver 2 can determine the sequence in which to transport the transport packets of the asset by analyzing such inter sequence numbers.

FIG. 7 is a diagram of an example of a structure (syntax) of a transport packet header of the transport packet in FIG. 6.

In the transport packet header structure in FIG. 7, if a concatenated_flag='1' follows a 1-bit flag concatenated_flag, a 16-bit value concatenated_sequence_number indicating the concatenated sequence number follows. In addition, if the concatenated_flag='1' does not follow the 1-bit flag concatenated_flag, a 16-bit value sequence_number indicating a sequence number similar to a conventional sequence number follows.

In this way, the header generating unit 14 can generate a transport packet including a concatenated sequence number that incorporates the intra sequence number and the inter sequence number.

As a result, the receiver 2 that has received the transport packet can recognize the transport sequence of the transport packet within the asset and the transport sequence of the transport packet within the sub-asset.

In the description above, the transport packets of which the inter sequence number is an even number are included in the sub-asset 1 and the transport packets of which the inter sequence number is an odd number are included in the sub-asset 2. However, the sub-asset in which a transport packet is included is not limited thereto and is arbitrary.

[Specific Example of Composition Information]

Next, a specific example of the composition information will be described with reference to FIG. 8. FIG. 8 is a diagram of an example of the composition information.

In the composition information shown in FIG. 8, a region r1 (corresponding to full screen display) and a region r2 (corresponding to an upper left region when the display screen is divided vertically and laterally into four regions) are defined by a <layout> tag. A sub-asset a11 and a sub-asset a12 are associated with the region r1 by a <union> tag designating uniting of the sub-assets composing an asset. In addition, whether a sub-asset a21 can be displayed in the region r2 or a sub-asset a22 can be displayed in the region r2 is defined by an <excl> tag designating mutually exclusive display of the asset. In addition, a description (start="0 s") that indicates that the layout is applied from time 0 s is included.

Therefore, simultaneously with the start of reproduction of the content including the sub-assets a11, a12, a21, and a22, the receiver 2 unites the sub-assets a11 and a12 and performs full-screen display thereof, and reduces the sub-asset a21 or a22 to one-fourth and displays the sub-asset a21 or a22 in the upper left of the screen, as shown in FIG. 8.

In FIG. 8, an example in which the composition information is written in synchronized multimedia integration language (SMIL) is shown. However, the composition information is merely required to indicate the display format of the asset, and the writing format thereof is not particularly limited.

[Flow of Transport Packet Generation Process]

Figure 9:
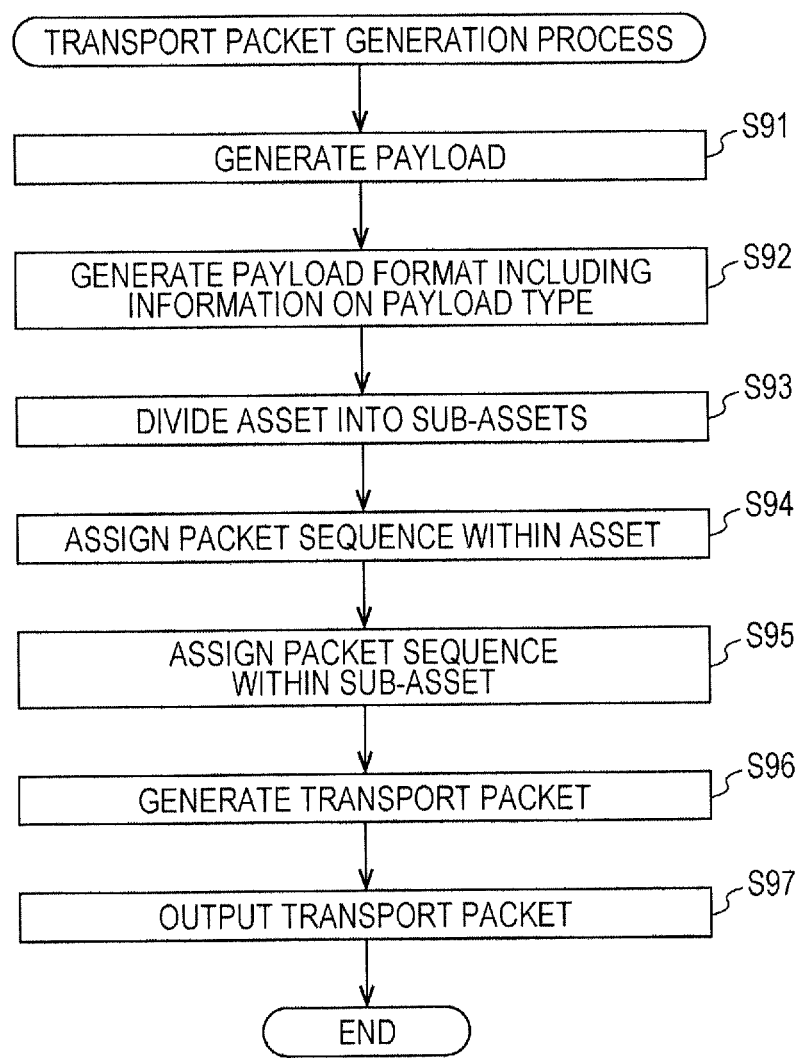
FIG. 9 is a flowchart of an example of a transport packet generation process performed by the transmitter.

Next, the flow of a transport packet generation process (packet generation method) performed by the transmitter 1 will be described with reference to FIG. 9. FIG. 9 is a flowchart of an example of the transport packet generation process. The timing at which the transport packet generation process is performed is not particularly limited. For example, in on-demand delivery, the transport packet generation process may be performed when a transmission request for content is received from the receiver 2. In live delivery, the transport packet generation process may be performed when the content is coded.

First, the content dividing unit 13 reads out the content 16 stored in the transmitter storage unit 11 and generates a payload (strictly speaking, data stored in the payload portion of the transport packet in FIG. 3). Specifically, the content dividing unit 13 acquires the asset from the content 16 stored as a package, as shown in FIG. 2, and generates a plurality of payloads by dividing the acquired asset (S91). Then, the content dividing unit 13 outputs the plurality of payloads generated as described above to the header generating unit 14.

The unit by which the asset is divided into payloads is not limited to the media unit. For example, when the size of the payload is restricted, the payload may be the media unit further divided into a predetermined size. In addition, when minimization of the overhead for division or the like is desired, a plurality of media units may be combined to form a single payload. Furthermore, the content dividing unit 13 extracts the composition information (CI) and the transport characteristics information (TC) included in the package from the content 16 and outputs the composition information (CI) and the transport characteristics information (TC) to the header generating unit 14.

Next, the header generating unit 14 generates the payload format that includes information indicating the payload type from the plurality of payloads that have been inputted (S92). Specifically, the header generating unit 14 generates the payload format header in which information (payload_type=MU) indicating that the payload type is media unit is written. The header generating unit 14 attaches the payload format header to each media unit and generates the payload format such as that shown in FIG. 3.

The payload type of the payload format is based on the data received from the content dividing unit 13. For example, when the composition information is inputted from the content dividing unit 13, a payload format header is generated in which the information (payload_type=CI) indicating that the payload type is composition information is written. Similarly, when the transport characteristics information (TC) is inputted, a payload format header is generated in which the information (payload_type=TC) indicating that the payload type is transport characteristics information is written.

Next, the content dividing unit 13 divides the acquired asset into sub-assets (subsets). Specifically, the content dividing unit 13 divides each of the plurality of payloads generated at S91 into a plurality of sub-assets (S93; dividing step).

Next, the transport sequence assigning unit 15 assigns information (inter sequence number) indicating the transport sequence of the payload within the content (asset), to each of the plurality of payloads divided by the content dividing unit 13 (S94; first transport sequence assigning step). In addition, the transport sequence assigning unit 15 assigns information (intra sequence number) indicating the transport sequence of the payload within the sub-asset to each of the plurality of payloads divided by the content dividing unit 13 (S95; second transport sequence assigning step).

Then, the header generating unit 14 generates a transport packet header including the inter sequence number and the intra sequence number assigned to each payload at S94 and S95, adds the transport packet header to the payload format generated at S92, and generates a transport packet such as that shown in FIG. 3 (S96; packet generating step).

Then, the header generating unit 14 outputs the generated transport packet to the transmitter communication unit 12 (S97), and the transport packet generation process is completed. As a result, the transport packet generated as described above is transmitted over the network to the receiver 2.

In this way, the transmitter 1 of the present invention generates a transport packet including the inter sequence number indicating the transport sequence of the payload within the asset and the intra sequence number indicating the transport sequence of the payload within the sub-asset, for each of the plurality of payloads.

Therefore, the receiver 2 that has received the transport packet can know the transport sequence of the payload in asset units and sub-asset units based on the transport sequence of the payload within the asset and the transport sequence of the payload within the sub-asset. As a result, the receiver 2 can easily determine which transport packet has not been transported and an effect in which packet loss can be easily detected is achieved.

[Flow of Reproduction Process]

Figure 10:
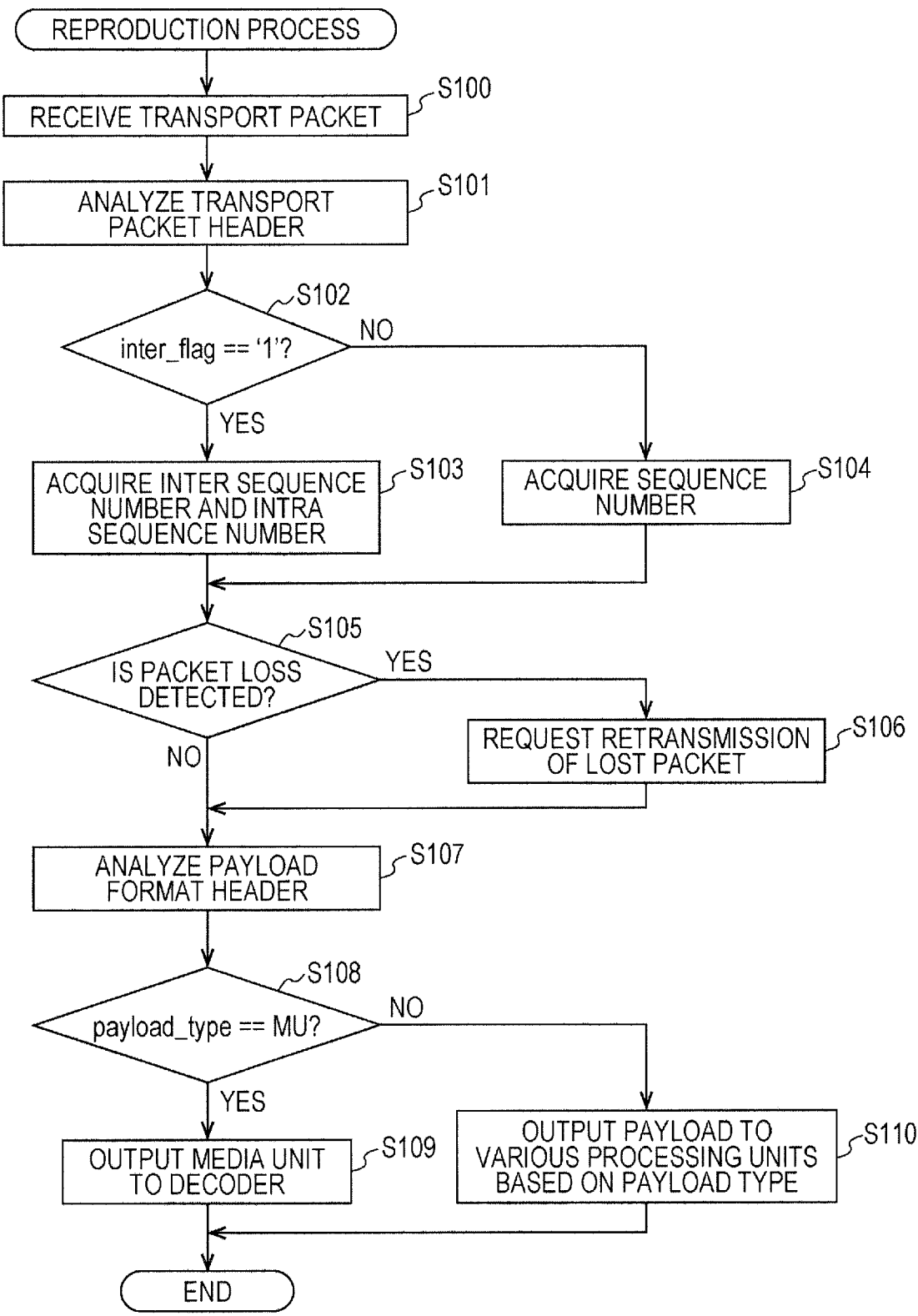
FIG. 10 is a flowchart of an example of a reproduction process performed by the receiver.

Next, the flow of a reproduction process (reproduction method) performed by the receiver 2 will be described with reference to FIG. 10. FIG. 10 is a flowchart of an example of the reproduction process. In FIG. 10, a process from the reception of a single transport packet to output thereof is described. The transport packet header structure shown in FIG. 5 is used.

The receiver communication unit 22 receives the transport packet transmitted from the transmitter communication unit 12 of the transmitter 1 over the network (S100) and outputs the transport packet to the header analyzing unit 25. Then, the header analyzing unit 25 analyzes the header (transport packet header) of the received transport packet (S101) and determines whether the inter_flag=='1' (S102; detecting step).

As a result of the analysis, when confirmed that the inter_flag=='1' (Yes at S102), the header analyzing unit 25 acquires the inter sequence number and the intra sequence number included in the transport packet header (S103). On the other hand, when the inter_flag is not inter_flag=='1' (No at S102), the header analyzing unit 25 acquires the sequence number included in the transport packet header (S104).

Next, the header analyzing unit 25 detects whether or not packet loss has occurred based on the sequence number acquired at S103 or S104 and the sequence number of a previously received transport packet (S105; detecting step). When a packet loss is detected (Yes at S105), the header analyzing unit 25 instructs the receiver communication unit 22 to make a retransmission request for the lost packet (S106). In particular, if the loss of a plurality of packets is detected when the inter_flag=='1', the retransmission request is made starting from the packet with the smaller inter sequence number. As a result, transport delay attributed to retransmission can be reduced.

After S105 or S106 is completed, the header analyzing unit 25 analyzes the payload format header (S107) and determines whether or not the payload_type==MU (S108). When the payload_type==MU (Yes at S108), the header analyzing unit 25 outputs, to the decoder 26, the media unit included in the transport packet to which the payload format header is attached (S109).

As a result, the media unit is decoded and outputted from the display unit 23 and/or the sound output unit 24 based on the composition information, under the control of the reproduction control unit 27 (reproduction step). The reproduction process is thereby completed.

On the other hand, as a result of the analysis at S107, when the payload_type is not payload_type==MU (No at S108), the header analyzing unit 25 outputs the payload to each processing unit based on the payload_type (S110). For example, when the payload_type==CI, because the payload includes the composition information, the payload is transmitted to the reproduction control unit 27 and the reproduction control unit 27 makes settings. The reproduction process is thereby completed.

In this way, when the received transport packet includes the transport sequence of the payload within the asset and the transport sequence of the payload within the sub-asset, the receiver 2 of the present invention can easily determine whether or not there is a transport packet that has not been received and can reduce the transport delay attributed to the retransmission request for the lost packet.

[Variation Example: Allocated Bits for Inter Sequence Number and Intra Sequence Number]

In the description above, the inter sequence number and the intra sequence number are both allocated eight bits. However, bit allocations of the inter sequence number and the intra sequence number are not limited thereto. The bit allocations of the inter sequence number and the intra sequence number may be equal. Alternatively, either of the inter sequence number and the intra sequence number may be allocated a larger number of bits.

For example, when the number of divisions into sub-assets increases, the inter sequence number may be allocated more bits than the intra sequence number. For example, the inter sequence number may be allocated ten bits and the intra sequence number may be allocated six bits.

Alternatively, the number of bits may be dynamically changed by information indicating an allocation pattern for the inter sequence number and the intra sequence number being added to the transport packet header or the like. In this instance, the receiver 2 side analyzes the transport packet header to which the information indicating the allocation pattern is attached, thereby confirming the number of bits respectively allocated to the inter sequence number and the intra sequence number.

[Variation Example: Division of Transport Packet Into Sub-Assets]

In the description above, an asset is divided into two sub-assets. However, the number of sub-assets into which an asset can be divided is not limited to two, and is arbitrary. In addition, it is described that a transport packet is included in any one sub-asset. However, a transport packet may be included in a plurality of sub-assets. This will be described with reference to FIG. 11.

Figure 11:
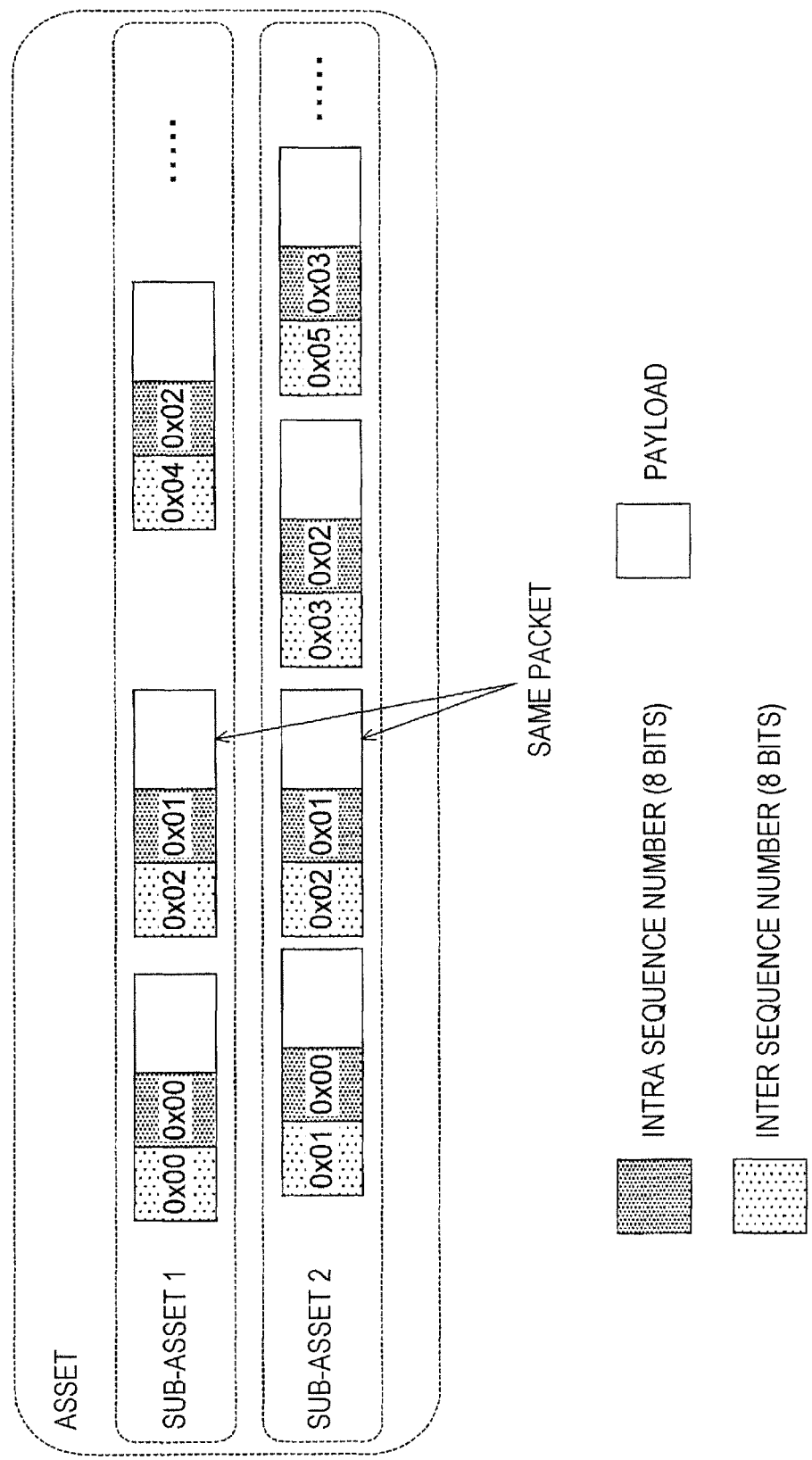
FIG. 11 is a diagram of an example of a transport packet when the same transport packet is included in a plurality of sub-assets.

FIG. 11 is a diagram of an example of a transport packet when the same transport packet is included in a plurality of sub-assets. As shown in FIG. 11, the asset is composed of the sub-asset 1 and the sub-asset 2. The sub-asset 1 includes transport packets of which the intra sequence numbers are 0x00, 0x01, 0x02, . . . , and the inter sequence numbers are 0x00, 0x02, 0x04, . . . . In addition, the sub-asset 2 includes transport packets of which the intra sequence numbers are 0x00, 0x01, 0x02, 0x03, . . . , and the inter sequence numbers are 0x01, 0x02, 0x03, 0x05, . . . .

As shown in FIG. 11, the sub-asset 1 and the sub-asset 2 both include transport packets that are given the same inter sequence number (0x02 in the example in FIG. 11). The inter sequence number indicates the transport sequence of the transport packet within the asset. Therefore, it is clear that transport packets having the same inter sequence number are the same packet.

In this way, as a result of the transport packets being made redundant by the same transport packet being included in a plurality of sub-assets, an effect in which tolerance to packet loss is increased is achieved.

[Variation Example: Sub-Asset Division Variation 1]

The content dividing unit 13 may divide the content into intra coded data (intra-frame compression-coded data) and inter coded data (inter-frame compression-coded data). The content dividing unit 13 may then include the intra coded data and inter coded data in differing sub-assets, and transport the sub-assets. This will be described with reference to FIG. 12.

Figure 12:
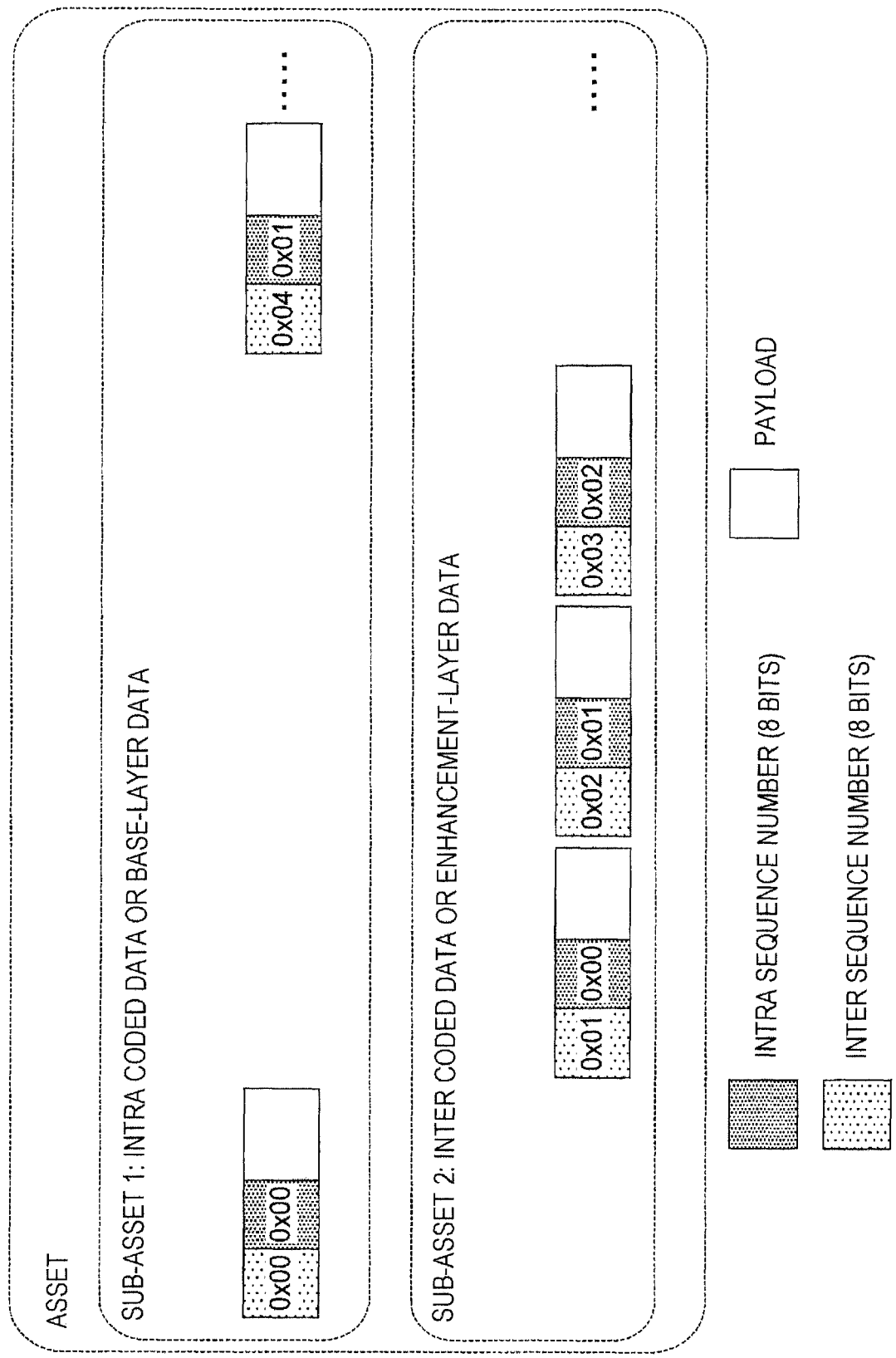
FIG. 12 is a diagram of an example of a transport packet when coded data is included as a transport packet in a plurality of sub-assets.

FIG. 12 is a diagram of an example of a transport packet when coded data is included in a plurality of sub-assets as a transport packet. As shown in FIG. 12, the asset is composed of the sub-asset 1 and the sub-asset 2. The sub-asset 1 includes transport packets of intra coded data. In addition, the sub-asset 2 includes transport packets of inter coded data. The transport packets included in the sub-asset 1 and the sub-asset 2 are transport packets that include the above-described inter sequence number and intra sequence number. FIG. 12 shows an example in which the inter sequence number and the intra sequence number are individually added to the payload. However, a concatenated sequence number incorporating the inter sequence number and the intra sequence number may be attached to the payload as shown in FIG. 6. The transmitter 1 transmits such asset.

When a user views content and performs a trick play such as fast-forward, the receiver 2 is merely required to receive the sub-asset 1. Even when a packet loss is detected in the transport packets of the sub-asset 2, the receiver 2 does not need to make a retransmission request for the transport packet. In addition, when the user is viewing content by normal playback, the receiver 2 is required to receive both the sub-asset 1 and the sub-asset 2. However, when packet loss is detected, decrease in overall quality can be suppressed by the receiver 2 preferentially making the retransmission request for the transport packet of the sub-asset 1.

In addition, the receiver 2 can easily know which packet has not been transported by analyzing the intra sequence numbers and the inter sequence numbers.

In this way, the asset in the present variation example is an asset that has been predictive-coded by combined use of a plurality of prediction methods (such as intra coding and inter coding). The content dividing unit 13 can divide an asset into a plurality of sub-assets in which each sub-asset is composed of units coded using the same prediction method.

[Variation Example: Sub-Asset Division Variation 2]

The content dividing unit 13 may perform hierarchical coding (such as time scalability) of content. The content dividing unit 13 may then include base-layer data (low frame rate video) and enhancement-layer data (differential video for high frame rate video) in differing sub-assets, and transport the sub-assets.

For example, as shown in FIG. 12, the sub-asset 1 includes transport packets of base-layer data and the sub-asset 2 includes the transport packets of enhancement-layer data. The transport packets included in the sub-asset 1 and the sub-asset 2 are transport packets that include the above-described inter sequence number and intra sequence number. FIG. 12 shows an example in which the inter sequence number and the intra sequence number are individually added to the payload. However, a concatenated sequence number incorporating the inter sequence number and the intra sequence number may be attached to the payload as shown in FIG. 6. The transmitter 1 transmits such asset.

When the user views content, if the content is played back as a low frame rate video, the receiver 2 is merely required to receive the sub-asset 1. Even when a packet loss is detected in the transport packets of the sub-asset 2, the receiver 2 does not need to make a retransmission request for the transport packet. In addition, when the user plays back the content as a high frame rate video, the receiver 2 is required to receive both the sub-asset 1 and the sub-asset 2. However, when packet loss is detected, decrease in overall quality can be suppressed by the receiver 2 preferentially making the retransmission request for the transport packet of the sub-asset 1.

In addition, the receiver 2 can easily know which packet has not been transported by analyzing the intra sequence numbers and the inter sequence numbers.

In this way, the plurality of payloads in the present variation example is composed of payloads of a plurality of layers having differing qualities such as frame rate. The content dividing unit 13 can divide an asset into a plurality of sub-assets in which each sub-asset is composed of payloads of the same layer.

[Variation Example: Sub-Asset Division Variation 3]

In the description above, the transmitter 1 generates a packet including one of a plurality of media units generated by dividing a single asset composing the content. However, the transmitter 1 may generate a packet including one of a plurality of media units generated by dividing each of a plurality of assets composing the content. This will be described with reference to FIG. 13.

Figure 13:
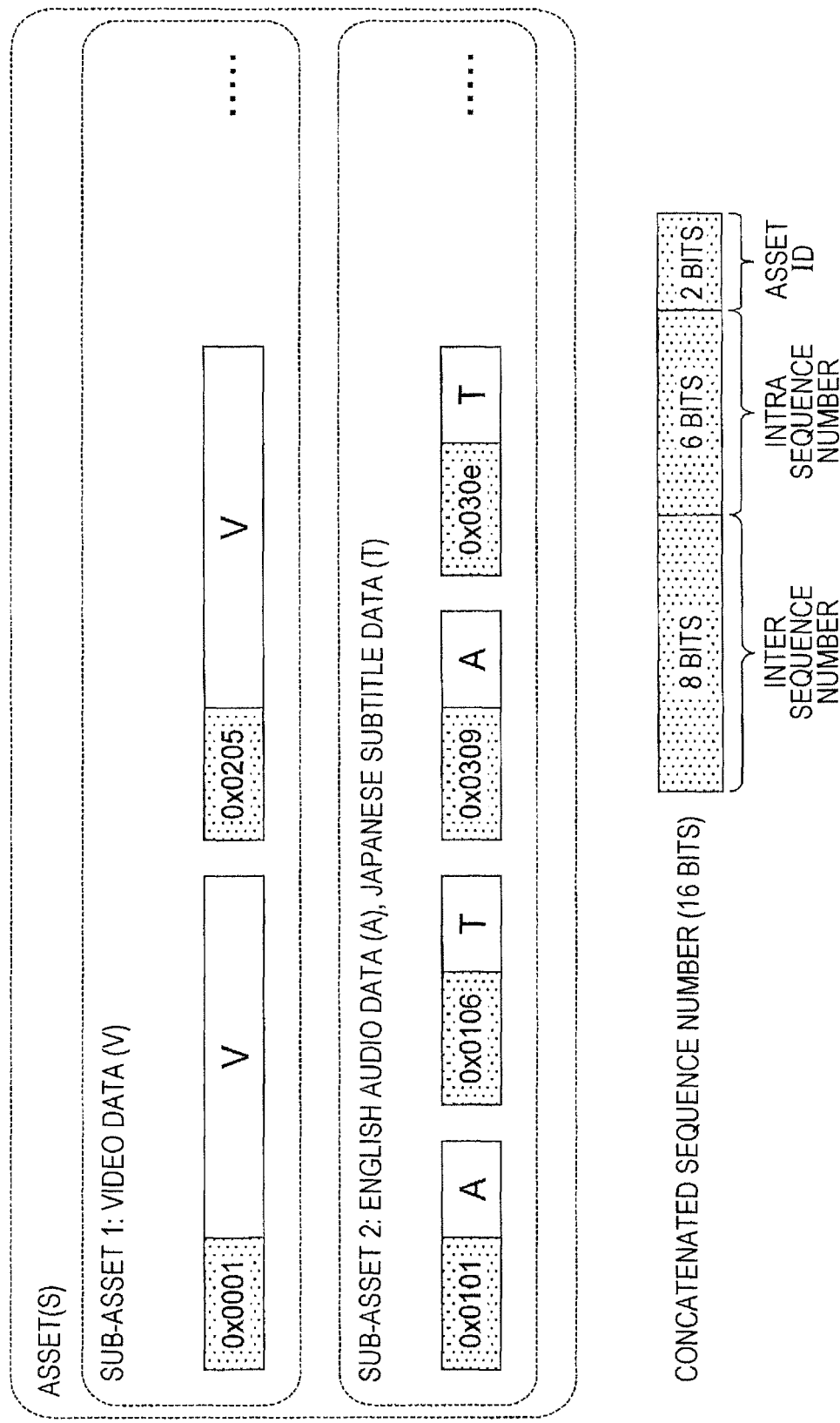
FIG. 13 is a diagram of an example of a transport packet when a plurality of assets are divided into a plurality of sub-assets.
Figure 14:
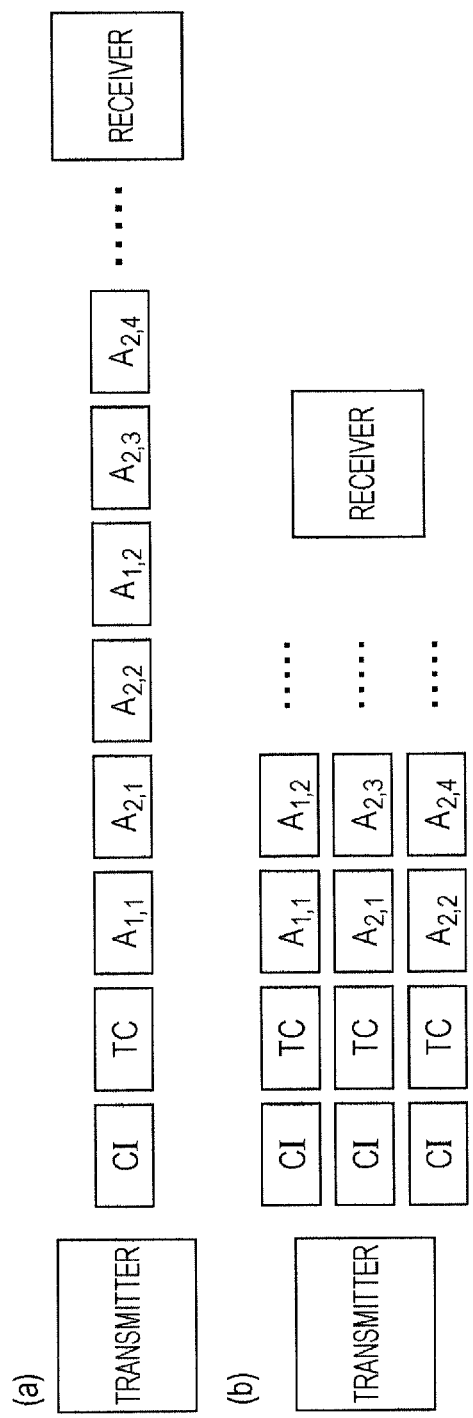

FIG. 13 is a diagram of an example of a transport packet when a plurality of assets are divided into a plurality of sub-assets. As shown in FIG. 13, a concatenated sequence number is attached to the payload. The eight high-order bits of the concatenated sequence number indicates the inter sequence number. The subsequent six bits indicate the intra sequence number, and the two low-order bits indicate an asset ID (component information). Asset 1 (Asset ID=1) is a component in which video data and audio data are multiplexed. Specifically, the asset 1 includes video data (V) and English audio data (A). In addition, asset 2 (Asset ID=2) is a component composed of subtitle data in a plurality of languages, including Japanese subtitle data (T). Furthermore, the sub-asset 1 includes the video data (V) of the asset 1, and the sub-asset 2 includes the English audio data (A) of the asset 1 and the Japanese subtitle data (T) of the asset 2. The transmitter 1 transmits such assets.

The receiver 2 is required to receive both the sub-asset 1 and the sub-asset 2 for normal reproduction (reproduction using the video data and the audio data). However, when the subtitle is not displayed, or in other words, when the packets of the asset 2 are not used, the receiver 2 references the two low-order bits of the concatenated sequence number and destroys the packets including the subtitle data. In the data of the asset 2 shown in FIG. 13, the eight high-order bits (inter sequence number) of the concatenated sequence number are 0x01, 0x03, . . . and packets with 0x00 and 0x02 are not received. However, because the asset 2 is data that is not to be used, even when a packet loss in the data of the asset 2 is detected, the receiver 2 does not need to request retransmission of the transport packet from the transmitter 1.

In this way, in the present variation example, division is performed such that a plurality of payloads of a plurality of assets are included in a certain sub-asset (such as the sub-asset 2). The divided payload generates a transport packet including information (inter sequence number) indicating the transport sequence of the payload within the plurality of assets, information (intra sequence number) indicating the transport sequence of the payload within the sub-asset 2, and the asset ID indicating the asset of the payload among the plurality of assets.

Therefore, the receiver 2 that has received the transport packet is merely required to receive only the transport packets of the required asset (such as the asset 1) by referencing the asset ID. The process for requesting retransmission of a transport packet from the transmitter 1 when a transport packet of another asset (such as the asset 2) is not received can be omitted.

[Subject Performing Transport Packet Delivery]

In the description above, the transmitter 1 both generates and delivers the transport packet. However, the transport packet may be generated and delivered by differing devices. Alternatively, generation and delivery of transport packets may be each be performed by a plurality of devices. For example, a transport packet of content for broadcast delivery may be generated by a certain device, and a transport packet of content for on-demand delivery (such as communication delivery) may be generated by another device. In this instance, a transport packet including the packet sequence information may be generated in either of the certain device and the other device.

The present invention is not limited to the above-described embodiment and various modifications are possible within the scope indicated in the claims. In other words, embodiments achieved by combining technical means modified accordingly within the scope indicated by the claims are also included in the technical scope of the present invention.

[Example of Actualization by Software]

Finally, each block of the transmitter 1 and the receiver 2, particularly the transmitter control unit 10 and the receiver control unit 20, may be actualized by hardware by a logic circuit formed on an integrated circuit (IC) chip, or may be actualized by software using a central processing unit (CPU).

In the latter instance, the transmitter 1 and the receiver 2 each include a CPU that executes commands in a program that actualizes each function, a read-only memory (ROM) storing therein the program, a random access memory (RAM) in which the program is expanded, a storage device (recording medium), such as a memory, storing therein the program and various pieces of data, and the like. The object of the present invention can be achieved by the transmitter 1 and the receiver 2 each being provided with a recording medium in which program codes (executable program, intermediate code program, and source program) of the control programs of the transmitter 1 and the receiver 2 that are software actualizing the above-described functions is recorded, in a computer-readable manner, and a computer (or CPU or MPU) reading and running the program codes recorded in the recording medium.

As the recording medium, for example, tapes, such as a magnetic tape or a cassette tape, disks including magnetic disks, such as a Floppy® disk or a hard disk, and optical disks, such as CD-ROM/MO/MD/DVD/CD-R, cards, such as an IC card (including memory card)/optical card, semiconductor memories, such as mask ROM/EPROM/EEPROM/flash ROM, or logic circuits, such as a programmable logic device (PLD) or a field programmable gate array (FPGA), can be used.

In addition, the transmitter 1 and the receiver 1 may be configured to be connectable to a communication network, and the program codes may be provided via the communication network. The communication network in this instance is merely required to be capable of transmitting the program codes and is not particularly limited. For example, the Internet, intranets, extranets, LAN, ISDN, VAN, CATV communication networks, virtual private networks, telephone line networks, mobile communication networks, satellite communication networks, and the like can be used. In addition, a transmission medium configuring the communication network is merely required to be a medium capable of transmitting the program codes and is not limited to a particular configuration or type. For example, wired media such as IEEE1394, USB, power line carriers, cable TV channels, telephone lines, and asymmetric digital subscriber line (ADSL), and wireless media such as infrared media like IrDA or remote control, Bluetooth®, IEEE802.11 wireless, high data rate (HDR), near field communication (NFC), digital living network alliance (DLNA), mobile phone networks, satellite channels, and terrestrial digital networks can be used. The present invention can also be actualized in the form of computer data signals embedded in carrier waves in which program codes are embodied by electronic transport.

[Notes Related to the Present Invention]

The packet generating means of the generation device of the present invention preferably individually includes the first transport sequence information and the second transport sequence information in the packet. In addition, the packet generating means of the generation device of the present invention may collectively include the first transport sequence information and the second transport sequence information in the packet.

In the above-described configuration, the generation device is capable of generating a packet in which the first transport sequence information and the second transport sequence information are individually included, or a packet in which the first transport sequence information and the second transport sequence information are collectively included.

Therefore, the reproduction device that has received the packet can know the transport sequence of the unit in the component of the unit and the transport sequence of the unit in the subset, regardless of whether the packet includes the first transport sequence information and the second transport sequence information individually, or the packet includes the first transport sequence information and the second transport sequence information collectively.

In addition, the component of the generation device of the present invention is a component that is predictive-coded by combined use of a plurality of prediction methods. The dividing means may be configured to divide a set composed of the plurality of units into a plurality of subsets in which each subset is composed of units that are predictive-coded using the same prediction method.

In the above-described configuration, the generation device divides, for example, intra-frame compression-coded data and inter-frame compression-coded data into differing subsets.

Therefore, the reproduction device can select whether to receive only either of the intra-frame compression-coded data and the inter-frame compression-coded data that use differing prediction methods, or both.

In addition, the plurality of units of the generation device of the present invention are configured by units of a plurality of layers having differing qualities. The dividing means may be configured to divide a set composed of the plurality of units into a plurality of subsets in which each subset is composed of units of the same layer.

In the above-described configuration, the generation device divides, for example, base-layer data and enhancement-layer data coded by hierarchical coding into differing subsets.

Therefore, the reproduction device can select whether to receive only either of the base-layer data and the enhancement-layer data that are of differing layers in this way, or both.

In addition, the generation device of the generation device of the present invention is a generation device that generates a packet including one of a plurality of units generated by dividing each of a plurality of components composing a content. The first transport sequence assigning means may assign, to the packet including a unit, information indicating the transport sequence of the unit within the plurality of components as the first transport sequence information, for each of the plurality of units. The packet generating means may generate a packet including the first transport sequence information, the second transport sequence information, and component information indicating the component in which the unit is included.

In the above-described configuration, division is performed such that a plurality of units of a plurality of components are included in a certain subset. The divided unit generates a packet including the transport sequence of the unit within a plurality of components, the transport sequence of the unit within the subset, and component information indicating the component of the unit, among the plurality of components.

Therefore, the reproduction device that has received the packet is merely required to receive only the packets of the required component by referencing the component information. The process for requesting retransmission of a packet to the generation device when the packet of another component is not received can be omitted.

INDUSTRIAL APPLICABILITY

The present invention can be used in a transmitter that transmits content over a network and a receiver that receives content over a network.

REFERENCE SIGNS LIST 1 transmitter (generation device)
10 transmitter control unit
11 transmitter storage unit
12 transmitter communication unit
13 content dividing unit (dividing means)
14 header generating unit (packet generating means)
15 transport sequence assigning unit (first transport sequence assigning means and second transport sequence assigning means)
16 content
2 receiver (reproduction device)
20 receiver control unit
21 receiver storage unit
23 display unit
24 sound output unit
25 header analyzing unit (detecting means)
26 decoder
27 reproduction control unit (reproducing means)
3 content transmitting and receiving system

The invention claimed is:

1. A reproduction device that reproduces media units, the reproduction device comprising:
a receiving circuit receives a packet;
a detecting circuit that detects, from the packet,
one payload of a plurality of payloads included in a package,
a payload type indicating that a media unit is included in the payload,
first transport sequence information indicating a transport sequence number of the payload within the package,
second transport sequence information indicating a transport sequence number of the payload within a subset of the package,
a flag indicating whether or not the first transport sequence information is included in the packet, and whether or not the media unit is included in the payload by analyzing the payload type;
a decoding circuit that decodes the media unit in a case that the payload type indicates that the media unit is included in the payload; and
a reproduction circuit that reproduces the media unit based on at least one of the first transport sequence information and the second transport sequence information,
wherein the detecting circuit detects the first transport sequence information when the flag is equal to 1.

* * * * *